US012748989B2

(12) United States Patent
Ness et al.

(10) Patent No.: US 12,748,989 B2
(45) Date of Patent: Sep. 29, 2026

(54) DYNAMIC AUGMENTATION BASED ON DATA SAMPLE HARDNESS

(71) Applicant: International Business Machines Corporation, Armonk, NY (US)

(72) Inventors: Lior Ness, Ra'anana (IL); Yoel Shoshan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1106 days.

(21) Appl. No.: 16/942,997

(22) Filed: Jul. 30, 2020

(65) Prior Publication Data

US 2022/0036212 A1 Feb. 3, 2022

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ................................. G06N 5/04; G06N 20/00
See application file for complete search history.

(56) References Cited

U.S. PATENT DOCUMENTS

2019/0325269 A1 10/2019 Bagherinezhad et al.
2019/0354817 A1* 11/2019 Shlens ................. G06V 10/772
2020/0065992 A1* 2/2020 Sung .................... G06V 10/764
2021/0118128 A1* 4/2021 Cheng .................... G06N 3/045
2022/0319704 A1* 10/2022 Feng ..................... G06T 7/0012

OTHER PUBLICATIONS

H. Ghebrechristos and G. Alaghband, "Optimizing Training using Information Theory-Based Curriculum Learning Factory," 2019 IEEE 31st International Conference on Tools with Artificial Intelligence (ICTAI), Portland, OR, USA, 2019, pp. 1525-1530, DOI: 10.1109/ICTAI.2019.00218 (Year: 2019).*
"Optimizing Training using Information Theory Based Curriculum Learning Factory," 2019 IEEE 31st International Conference on Tools with Artificial Intelligence (ICTAI), Ghebrechristos (Year: 2019).*
"Optimizing Training using Information Theory Based Curriculum Learning Factory," 2019 IEEE 31st International Conference on Tools with Artificial Intelligence (ICTAI), Ghebrechristos et al; Ghebrechristos (Year: 2019).*

(Continued)

*Primary Examiner* — Michael J Huntley
*Assistant Examiner* — Paul J Breene
(74) *Attorney, Agent, or Firm* — Harrity & Harrity, LLP

(57) ABSTRACT

In an approach for dynamic augmentation based on data sample hardness for training a learning model, a processor defines one or more augmentations for a dataset for training the learning model. A processor applies the one or more augmentations to the dataset. A processor trains the learning model with the one or more augmentations. A processor measures hardness of one or more data samples in the dataset. A processor adjusts the one or more augmentations for the one or more data samples based on corresponding hardness of the one or more data samples. A processor applies the adjusted one or more augmentations to the dataset. A processor trains the learning model with the adjusted one or more augmentations applied to the dataset.

20 Claims, 3 Drawing Sheets

(56) References Cited

OTHER PUBLICATIONS

"Instance Adaptive Adversarial Training: Improved Accuracy Tradeoffs in Neural Nets," Balaji et al; Balaji, arXiv, 2019 (Year: 2019).*

Gong et al., "MaxUp: A Simple Way to Improve Generalization of Neural Network Training", ResearchGate, Feb. 2020, 11 pages, <https://www.researchgate.net/publication/339445609>.

Papernot et al., "The Limitations of Deep Learning in Adversarial Settings", 1st IEEE European Symposium on Security & Privacy, Mar. 21-24, 2016. Saarbrücken, Germany, 16 pages, <https://www.researchgate.net/publication/284788388>.

Pouyanfar et al., "Dynamic Sampling in Convolutional Neural Networks for Imbalanced Data Classification", Proceedings of the Conference on Multimedia Information Processing and Retrieval, Apr. 10-12, 2018, Miami, Florida, 6 pages, <https://ieeexplore.ieee.org/document/8396983>.

Rozsa et al., "Adversarial Diversity and Hard Positive Generation", ResearchGate, May 2016, 9 pages, <https://www.researchgate.net/publication/302376617>.

Zheng et al., "A Full Stage Data Augmentation Method in Deep Convolutional Neural Network for Natural Image Classification", Discrete Dynamics in Nature and Society, vol. 2020, Article ID 4706576, 12 pages, <https://www.hindawi.com/journals/ddns/2020/4706576/>.

* cited by examiner

DYNAMIC AUGMENTATION BASED ON DATA SAMPLE HARDNESS

BACKGROUND

The present disclosure relates generally to the field of machine learning, and more particularly to dynamic augmentation based on data sample hardness for training a learning model.

Data augmentation is a strategy that enables practitioners to significantly increase the diversity of data available for training models, without actually collecting new data. Data augmentation techniques such as cropping, padding, and horizontal flipping are commonly used to train large neural networks. Data augmentation adds value to base data by adding information derived from internal and external sources within an enterprise. Data augmentation can help reduce the manual intervention required to developed meaningful information and insight of business data, as well as significantly enhance data quality.

SUMMARY

Aspects of an embodiment of the present disclosure disclose an approach for dynamic augmentation based on data sample hardness for training a learning model. A processor defines one or more augmentations for a dataset for training the learning model. A processor applies the one or more augmentations to the dataset. A processor trains the learning model with the one or more augmentations. A processor measures hardness of one or more data samples in the dataset. A processor adjusts the one or more augmentations for the one or more data samples based on corresponding hardness of the one or more data samples. A processor applies the adjusted one or more augmentations to the dataset. A processor trains the learning model with the adjusted one or more augmentations applied to the dataset.

DETAILED DESCRIPTION

Figure 1:
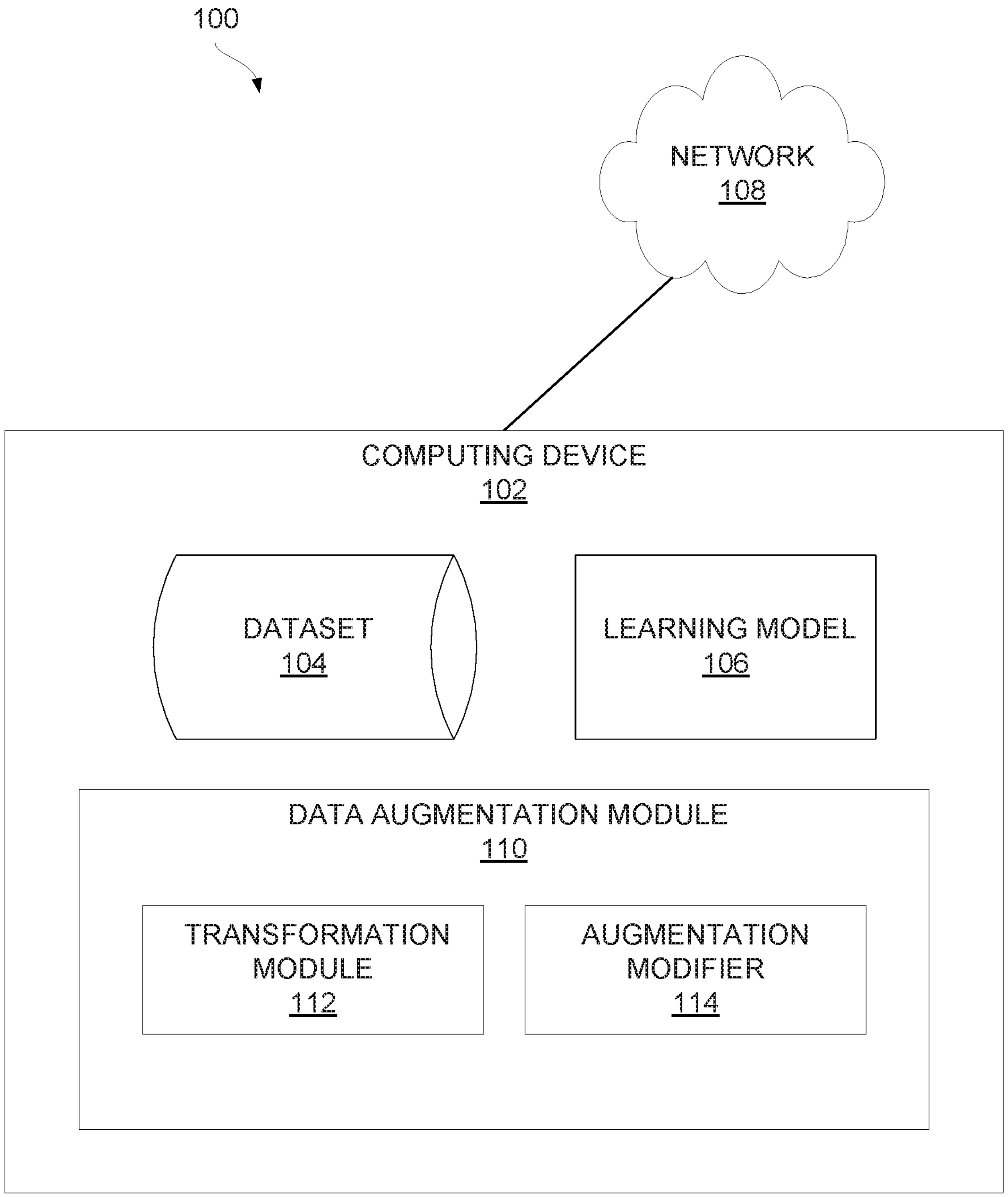
FIG. 1 is a functional block diagram illustrating a data augmentation environment, in accordance with an embodiment of the present disclosure.

The present disclosure is directed to systems and methods for dynamic augmentation based on data sample hardness for training a learning model.

Embodiments of the present disclosure recognize over-augmentation, e.g., over-rotation and over-contrast, may result in an unnatural appearance that either shifted sample out of expected data distribution or compromised learnable features or both. Embodiments of the present disclosure recognize a need to augment every data sample differently, based on how "hard" it is to classify, rather than using a single augmentation scheme for all samples. For example, a "hard" sample may be at risk of losing the learnable signal of the sample if augmentation is too harsh. An "easy" sample can be further augmented while still retaining the discriminative features of the sample. In an embodiment, data sample hardness may be defined as a measure of how "hard" vs. "easy" a sample is for a learning model in training. Sample hardness may be based on how far a model's prediction is from the ground truth label. Embodiments of the present disclosure recognize applying different augmentation schemes per data sample that are based on the individual sample hardness.

Embodiments of the present disclosure disclose defining an augmentation strength. An augmentation strength may be a single scalar parameter that defines the amount of augmentation applied, that is, the amount of deviation of augmented data from the source of the augmented data. For example, in a contrast transformation, the amount of augmentation may represent the amount of contrast applied. The augmentation strength parameter can adjust sampling ranges of multiple parameterized transformations by scaling upper and lower random sampling bounds of the sampling ranges. Embodiments of the present disclosure disclose adjusting a set of augmentations for each data sample based on each corresponding hardness of the data samples in a dataset. A data augmentation module may modulate the sampling ranges of the set of augmentations for each data sample based on each corresponding hardness of the data samples. In some embodiments, the data augmentation module may adjust all the set of augmentations globally for each data sample based on each corresponding hardness of the data samples.

In one or more embodiments, a data augmentation module may be configured to apply the adjusted augmentations to a dataset. A data augmentation module may apply the random augmentations with the modulated per-sample augmentation strength. A data augmentation module may augment easy samples with increased strength. A data augmentation module may augment hard samples with decreased strength. In an example, for an easy sample, a data augmentation module may increase the sampling ranges (e.g., lower bound going down and upper bound going up) by increasing the augmentation strength for the set of augmentations for the easy sample. In another example, for a hard sample, data augmentation module 110 may decreasing the sampling ranges (e.g., lower bound going up and upper bound going down) by decreasing the augmentation strength for the set of augmentations for the easy sample. For example, for the sampling ranges that are centered around zero, a data augmentation module may multiply the upper and lower bounds with the augmentation strength for the sampling ranges.

The present disclosure will now be described in detail with reference to the Figures. FIG. 1 is a functional block diagram illustrating data augmentation environment, generally designated 100, in accordance with an embodiment of the present disclosure.

In the depicted embodiment, data augmentation environment 100 includes computing device 102 and network 108. In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to dataset 104, learning model 106, data augmentation module 110, and network 108 and is capable of processing program instructions and executing data augmentation module 110, in accordance with an embodiment of the present disclosure. Computing device 102 may include internal and external hardware components, as depicted and described in further detail with respect to FIG. 3.

Further, in the depicted embodiment, computing device 102 includes dataset 104, learning model 106, and data augmentation module 110. Dataset 104 includes data samples for training learning model 106. In the depicted embodiment, dataset 104, learning model 106, and data augmentation module 110 are located on computing device 102. However, in other embodiments, dataset 104, learning model 106, and data augmentation module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and dataset 104, learning model 106, and data augmentation module 110, in accordance with a desired embodiment of the disclosure.

In one or more embodiments, data augmentation module 110 may be configured to define one or more augmentations for dataset 104 for training learning model 106. In an example, the one or more augmentations may be a set of random transformations that are applied during a training phase of learning model 106 to increase data variability. The added data variability may improve model performance and generalization capability of learning model 106. Random transformations can be parameterized: for example, image rotation (choosing a rotation angle), image contrast (choosing a contrast level to apply) or random noise (choosing the amount of noise to add). The parameters may be sampled randomly from pre-defined ranges of possible values, to ensure that the resulted sample will be "novel" but will still represent the natural data distribution and maintain the learnable signal of the resulted sample. Data augmentation module 110 may select transformations and corresponding random parameter sampling ranges of the transformations. The sampling ranges may be tuned as regular hyperparameters, e.g., using a dedicated validation set, to maximize model performance.

In one or more embodiments, data augmentation module 110 may be configured to apply one or more augmentations to dataset 104. Data augmentation module 110 may define an augmentation strength. An augmentation strength may be a single scalar parameter that defines the amount of augmentation applied, that is, the amount of deviation of augmented data from the source of the augmented data. For example, in a contrast transformation, the amount of augmentation may represent the amount of contrast applied. The augmentation strength parameter can adjust sampling ranges of multiple parameterized transformations by scaling upper and lower random sampling bounds of the sampling ranges. Data augmentation module 110 may set an initial augmentation strength to 1 (i.e., no augmentation strength modification initially). Data augmentation module 110 may modulate the sampling ranges. When the augmentation strength parameter is increased, the sampling ranges may be increased (lower bound goes down and upper bound goes up). When the augmentation strength parameter is decreased, the sampling ranges may be decreased. For example, for ranges that are centered around zero, data augmentation module 110 may multiply the upper and lower bounds with the augmentation strength for the sampling ranges.

In one or more embodiments, data augmentation module 110 may be configured to train learning model 106 with the one or more augmentations applied to dataset 104. With the initial augmentation strength being set as 1, data augmentation module 110 may apply the one or more augmentations to dataset 104 without modification of the sampling ranges, i.e., the sampling ranges being the same per the pre-defined sampling ranges in each of the augmentations to be applied in dataset 104. In an example, data augmentation module 110 may train learning model 106 for one epoch in which each data sample in dataset 104 has been entered and trained once to learning model 106. In another example, data augmentation module 110 may train learning model 106 for multiple epochs. Data augmentation module 110 may predefine the number of epochs for training learning model 106. Data augmentation module 110 may set a check point for the training after completing the predefined number of epochs.

In one or more embodiments, data augmentation module 110 may be configured to measure hardness of data samples in dataset 104. In some embodiments, data augmentation module 110 may measure hardness of one or more data samples in dataset 104. In other embodiments, data augmentation module 110 may measure hardness of each data sample in dataset 104. For example, during the training phase, at the end of each epoch, data augmentation module 110 may run inference on dataset 104. Data augmentation module 110 may measure sample hardness for every data sample in dataset 104. In an example, data augmentation module 110 may define a "hard" sample which is at risk of losing the learnable signal if augmentation is too harsh. An "easy" sample can be further augmented while still retaining the discriminative features of the sample. Data augmentation module 110 may transform an easy sample into novel, more challenging sample that may incur more optimizing loss and result in additional learning. In an embodiment, data augmentation module 110 may define sample hardness as a measure of how "hard" vs. "easy" a sample is for learning model 106 in training. Sample hardness may be based on how far a model's prediction is from the ground truth label. For example, in a binary classification scheme, one possible hardness measure may be:

$$\text{HARDNESS} = \begin{cases} 1-p & \text{if } y=1 \\ p & \text{otherwise} \end{cases}$$

Where $y \in \{0, 1\}$ is the ground truth class label and $p \in [0, 1]$ is the model's estimated probability for the class with label $y=1$. Other suitable definitions for hardness are possible.

In one or more embodiments, data augmentation module 110 may be configured to adjust a set of augmentations for each data sample based on each corresponding hardness of the data samples. Data augmentation module 110 may augment every data sample differently, based on how "hard" the data sample is to classify. Data augmentation module 110 may modulate the sampling ranges of the set of augmentations for each data sample based on each corresponding hardness of the data samples. In some embodiments, data augmentation module 110 may adjust all the set of augmentations globally for each data sample based on each corresponding hardness of the data samples. However, in other embodiments, data augmentation module 110 may adjust some of the set of augmentations for each data sample based on each corresponding hardness of the data samples. In some embodiments, data augmentation module 110 may adjust the set of augmentations globally for all data samples in dataset 104 based on each corresponding hardness of the data samples. However, in other embodiments, data augmentation module 110 may adjust the set of augmentations for some data samples in dataset 104 based on each corresponding hardness of the data samples. Data augmentation module 110 may define an augmentation strength. An augmentation strength may be a single scalar parameter that defines the amount of augmentation applied, that is, the amount of deviation of augmented data from the source of the augmented data. For example, in a contrast transformation, the amount of augmentation may represent the amount of contrast applied. The augmentation strength parameter can adjust sampling ranges of multiple parameterized transformations by scaling upper and lower random sampling bounds of the sampling ranges.

In one or more embodiments, data augmentation module 110 may be configured to apply the adjusted augmentations to dataset 104. Data augmentation module 110 may apply the random augmentations with the modulated per-sample augmentation strength. Data augmentation module 110 may augment easy samples with increased strength. Data augmentation module 110 may augment hard samples with decreased strength. In an example, for an easy sample, data augmentation module 110 may increase the sampling ranges (e.g., lower bound going down and upper bound going up) by increasing the augmentation strength for the set of augmentations for the easy sample. In another example, for a hard sample, data augmentation module 110 may decrease the sampling ranges (e.g., lower bound going up and upper bound going down) by decreasing the augmentation strength for the set of augmentations for the easy sample. For example, for the sampling ranges that are centered around zero, data augmentation module 110 may multiply the upper and lower bounds with the augmentation strength for the sampling ranges.

In one or more embodiments, data augmentation module 110 may be configured to train machine learning model 106 with the adjusted one or more augmentations applied to dataset 104. Data augmentation module 110 may gradually increase augmentation strength on top of the modulations per data sample to increase the overall data "hardness" as a form of curriculum learning.

In the depicted embodiment, data augmentation module 110 includes transformation module 112 and augmentation modifier 114. In one or more embodiments, transformation module 112 may be configured to apply a set of random transformations during a training phase of learning model 106 to increase data variability. The added data variability may improve model performance and generalization capability of learning model 106. Random transformations can be parameterized: for example, image rotation (choosing a rotation angle), image contrast (choosing a contrast level to apply) or random noise (choosing the amount of noise to add). The parameters may be sampled randomly from predefined ranges of possible values, to ensure that the resulted sample will be "novel" but will still represent the natural data distribution and maintain the learnable signal of the resulted sample. Data augmentation module 110 may select transformations and corresponding random parameter sampling ranges of the transformations. The sampling ranges may be tuned as regular hyperparameters, e.g., using a dedicated validation set, to maximize model performance of learning model 106.

In one or more embodiments, augmentation modifier 114 may be configured to modify an augmentation applied to dataset 104. Augmentation modifier 114 may define an augmentation strength. An augmentation strength may be a single scalar parameter that defines the amount of augmentation applied, that is, the amount of deviation of augmented data from the source of the augmented data. For example, in a contrast transformation, the amount of augmentation may represent the amount of contrast applied. The augmentation strength parameter can adjust sampling ranges of multiple parameterized transformations by scaling upper and lower random sampling bounds of the sampling ranges. Augmentation modifier 114 may set an initial augmentation strength to 1 (i.e., no augmentation strength modification initially). Augmentation modifier 114 may modulate the sampling ranges. When the augmentation strength parameter is increased, the ranges are increased (lower bound goes down and upper bound goes up). When the augmentation strength parameter is decreased, the ranges are decreased. For example, for ranges that are centered around zero, augmentation modifier 114 may multiply the upper and lower bounds with the augmentation strength for the sampling ranges.

In one or more embodiments, augmentation modifier 114 may be configured to adjust an augmentation for each data sample based on each corresponding hardness of the data samples in dataset 104. Augmentation modifier 114 may augment every data sample differently, based on how "hard" the data sample is to classify. Augmentation modifier 114 may modulate the sampling ranges of the set of augmentations for each data sample based on each corresponding hardness of the data samples. In some embodiments, augmentation modifier 114 may adjust all the set of augmentations globally for each data sample based on each corresponding hardness of the data samples. However, in other embodiments, augmentation modifier 114 may adjust some of the set of augmentations for each data sample based on each corresponding hardness of the data samples. In some embodiments, augmentation modifier 114 may adjust the set of augmentations globally for all data samples in dataset 104 based on each corresponding hardness of the data samples. However, in other embodiments, augmentation modifier 114 may adjust the set of augmentations for some data samples in dataset 104 based on each corresponding hardness of the data samples. Augmentation modifier 114 may define an augmentation strength. An augmentation strength may be a single scalar parameter that defines the amount of augmentation applied, that is, the amount of deviation of augmented data from the source of the augmented data. For example, in a contrast transformation, the amount of augmentation may represent the amount of contrast applied. The augmentation strength parameter can adjust sampling ranges of multiple parameterized transformations by scaling upper and lower random sampling bounds of the sampling ranges. Augmentation modifier 114 may apply the adjusted augmentations to dataset 104. Augmentation modifier 114 may augment easy samples with increased strength. Augmentation modifier 114 may augment hard samples with decreased strength. In an example, for an easy sample, augmentation modifier 114 may increase the sampling ranges (e.g., lower bound going down and upper bound going up) by increasing the augmentation strength for the set of augmentations for the easy sample. In another example, for a hard sample, augmentation modifier 114 may decreasing the sampling ranges (e.g., lower bound going up and upper bound going down) by decreasing the augmentation strength for the set of augmentations for the easy sample. For example, for the sampling ranges that are centered around zero, augmentation modifier 114 may multiply the upper and lower bounds with the augmentation strength for the sampling ranges.

Figure 2:
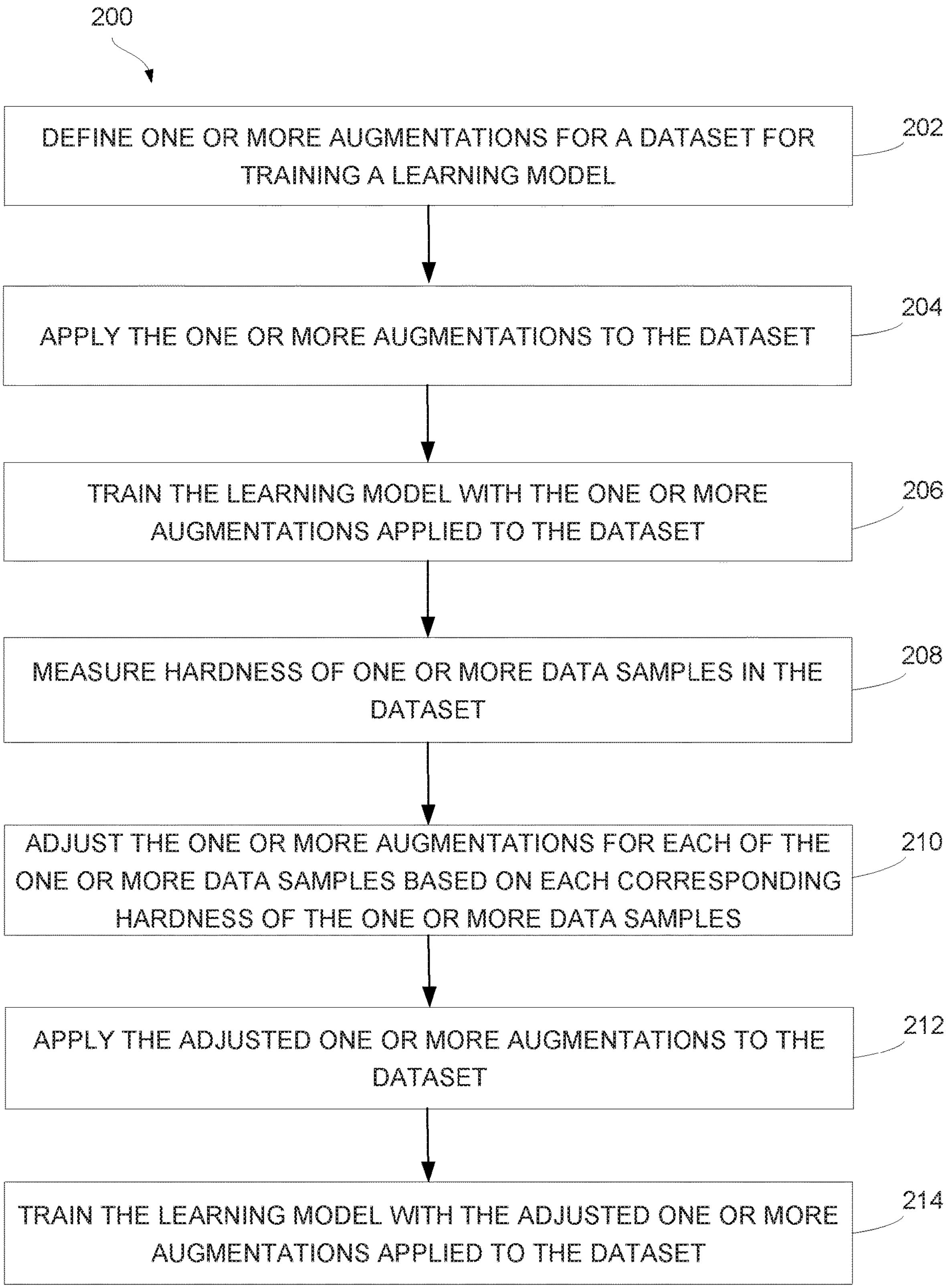
FIG. 2 is a flowchart depicting operational steps of a data augmentation module within a computing device of FIG. 1, in accordance with an embodiment of the present disclosure.

FIG. 2 is a flowchart 200 depicting operational steps of data augmentation module 110 in accordance with an embodiment of the present disclosure.

Data augmentation module 110 operates to define one or more augmentations for dataset 104 for training learning model 106. Data augmentation module 110 also operates to apply the one or more augmentations to dataset 104. Data augmentation module 110 operates to train learning model 106 with the one or more augmentations applied to dataset 104. Data augmentation module 110 operates to measure hardness of data samples in dataset 104. Data augmentation module 110 operates to adjust the one or more augmentations for each data sample based on each corresponding hardness of the data samples. Data augmentation module 110 operates to apply the adjusted augmentations to dataset 104 for training learning model 106. Data augmentation module 110 operates to train learning model 106 with the adjusted one or more augmentations applied to dataset 104.

In step 202, data augmentation module defines one or more augmentations for dataset 104 for training learning model 106. In an example, the one or more augmentations may be a set of random transformations that may be applied during a training phase of learning model 106 to increase data variability. The added data variability may improve model performance and generalization capability of learning model 106. Random transformations can be parameterized: for example, image rotation (choosing a rotation angle), image contrast (choosing a contrast level to apply) or random noise (choosing the amount of noise to add). The parameters may be sampled randomly from pre-defined ranges of possible values, to ensure that the resulted sample will be "novel" but will still represent the natural data distribution and maintain the learnable signal of the resulted sample. Data augmentation module 110 may select transformations and sampling ranges of the transformations. The sampling ranges may be tuned as regular hyperparameters, e.g., using a dedicated validation set, to maximize model performance.

In step 204, data augmentation module 110 applies the one or more augmentations to dataset 104. Data augmentation module 110 may define an augmentation strength. An augmentation strength may be a single scalar parameter that defines the amount of the augmentations applied, that is, the amount of deviation of augmented data from the source of the augmented data. For example, in a contrast transformation, the amount of augmentation may represent the amount of contrast applied. The augmentation strength parameter can adjust sampling ranges of multiple parameterized transformations by scaling upper and lower random sampling bounds of the sampling ranges. Data augmentation module 110 may set an initial augmentation strength to 1 (i.e., no augmentation strength modification initially). Data augmentation module 110 may modulate the sampling ranges. When the augmentation strength parameter is increased, the ranges are increased (lower bound goes down and upper bound goes up). When the augmentation strength parameter is decreased, the ranges are decreased. For example, for ranges that are centered around zero, data augmentation module 110 may multiply the upper and lower bounds with the augmentation strength for the sampling ranges.

In step 206, data augmentation module 110 trains learning model 106 with the one or more augmentations applied to dataset 104. With an initial augmentation strength being set as 1, data augmentation module 110 may apply the one or more augmentations to dataset 104 without modification of the sampling ranges, i.e., the sampling ranges being the same per the pre-defined sampling ranges in each of the augmentations to be applied in dataset 104. In an example, data augmentation module 110 may train learning model 106 for one epoch in which each data sample in dataset 104 has been entered and trained once for learning model 106. In another example, data augmentation module 110 may train learning model 106 for multiple epochs. Data augmentation module 110 may predefine the number of epochs for training learning model 106. Data augmentation module 110 may set a check point for the training after completing the predefined number of epochs.

In step 208, data augmentation module 110 measures hardness of data samples in dataset 104. In some embodiments, data augmentation module 110 may measure hardness of one or more data samples in dataset 104. In other embodiments, data augmentation module 110 may measure hardness of each data sample in dataset 104. For example, during the training phase, at the end of each epoch, data augmentation module 110 may run inference on dataset 104. Data augmentation module 110 may measure sample hardness for every data sample in dataset 104. In an example, data augmentation module 110 may define a "hard" sample which is at risk of losing the learnable signal if augmentation is too harsh. An "easy" sample can be further augmented while still retaining the discriminative features of the sample. Data augmentation module 110 may transform an easy sample into novel, more challenging sample that may incur more optimizing loss and result in additional learning. In an embodiment, data augmentation module 110 may define sample hardness as a measure of how "hard" vs. "easy" a sample is for learning model 106 in training. Sample hardness may be based on how far a model's prediction is from the ground truth label. For example, in a binary classification scheme, one possible hardness measure may be defined as:

$$\text{HARDNESS} = \begin{cases} 1-p & \text{if } y=1 \\ p & \text{otherwise} \end{cases}$$

Where $y \in \{0, 1\}$ is the ground truth class label and $p \in [0, 1]$ is the model's estimated probability for the class with label $y=1$. Other suitable definitions for hardness are possible.

In step 210, data augmentation module 110 adjusts the one or more augmentations for each data sample based on each corresponding hardness of the data samples. Data augmentation module 110 may augment every data sample differently, based on how "hard" the data sample is to classify. Data augmentation module 110 may modulate the sampling ranges of the set of augmentations for each data sample based on each corresponding hardness of the data samples. In some embodiments, data augmentation module 110 may adjust all the set of augmentations globally for each data sample based on each corresponding hardness of the data samples. However, in other embodiments, data augmentation module 110 may adjust some of the set of augmentations for each data sample based on each corresponding hardness of the data samples. In some embodiments, data augmentation module 110 may adjust the set of augmentations globally for all data samples in dataset 104 based on each corresponding hardness of the data samples. However, in other embodiments, data augmentation module 110 may adjust the set of augmentations for some data samples in dataset 104 based on each corresponding hardness of the data samples. Data augmentation module 110 may define an augmentation strength. An augmentation strength may be a single scalar parameter that defines the amount of augmentation applied, that is, the amount of deviation of augmented data from the source of the augmented data. For example, in a contrast transformation, the amount of augmentation may represent the amount of contrast applied. The augmentation strength parameter can adjust sampling ranges of multiple parameterized transformations by scaling upper and lower random sampling bounds of the sampling ranges.

In step 212, data augmentation module 110 applies the adjusted augmentations to dataset 104 for training learning model 106. Data augmentation module 110 may apply the random augmentations with the modulated per-sample augmentation strength. Data augmentation module 110 may augment easy samples with increased augmentation strength. Data augmentation module 110 may augment hard samples with decreased augmentation strength. In an example, for an easy sample, data augmentation module 110 may increase the sampling ranges (e.g., lower bound going down and upper bound going up) by increasing the augmentation strength for the set of augmentations for the easy sample. In another example, for a hard sample, data augmentation module 110 may decreasing the sampling ranges (e.g., lower bound going up and upper bound going down) by decreasing the augmentation strength for the set of augmentations for the easy sample. For example, for the sampling ranges that are centered around zero, data augmentation module 110 may multiply the upper and lower bounds with the augmentation strength for the sampling ranges.

In step 214, data augmentation module 110 trains learning model 106 with the adjusted one or more augmentations applied to dataset 104. Data augmentation module 110 may gradually increase augmentation strength on top of the modulations per data sample to increase the overall data "hardness" as a form of curriculum learning.

Figure 3:
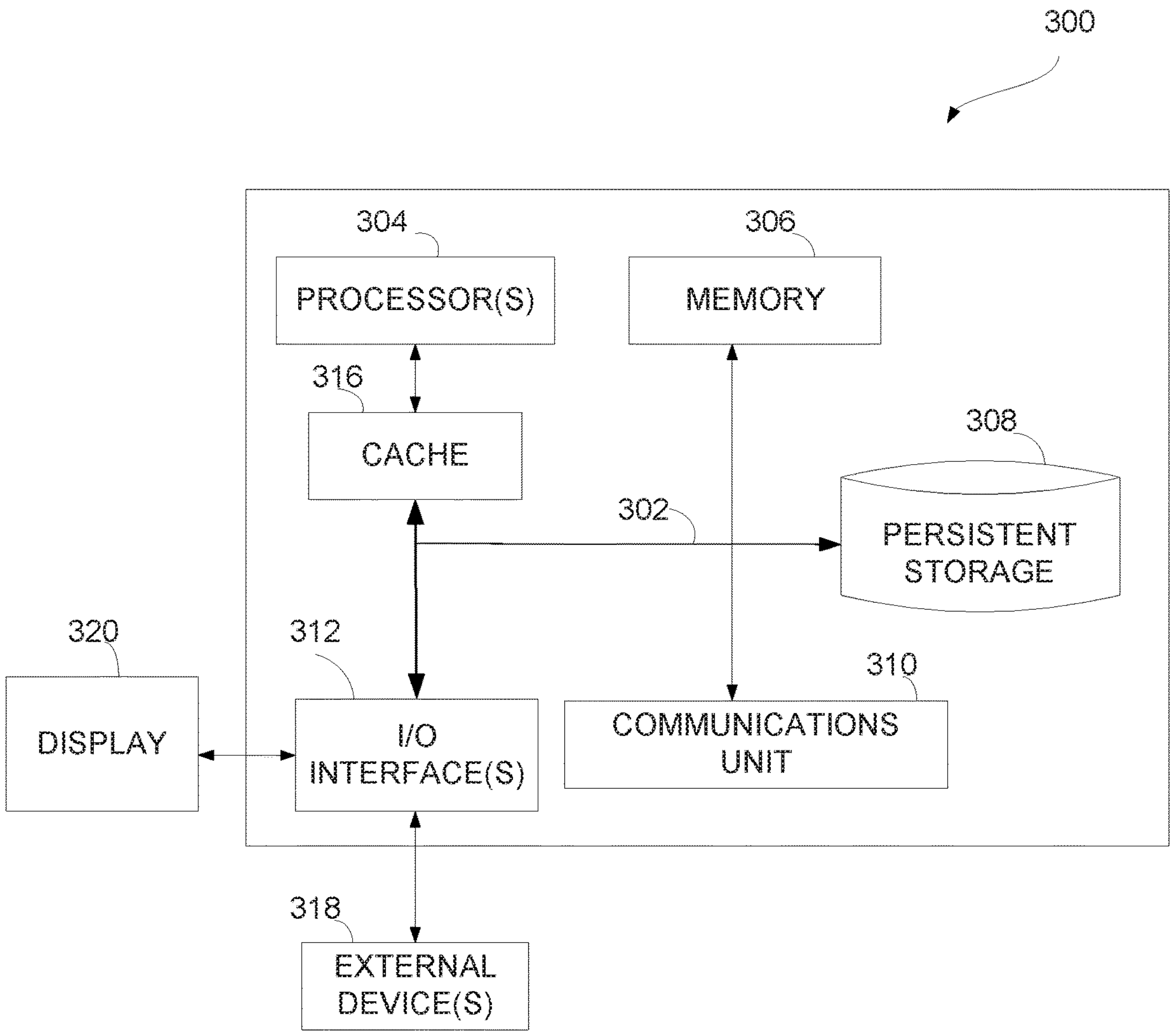
FIG. 3 is a block diagram of components of the computing device of FIG. 1, in accordance with an embodiment of the present disclosure.

FIG. 3 depicts a block diagram 300 of components of computing device 102 in accordance with an illustrative embodiment of the present disclosure. It should be appreciated that FIG. 3 provides only an illustration of one implementation and does not imply any limitations with regard to the environments in which different embodiments may be implemented. Many modifications to the depicted environment may be made.

Computing device 102 may include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Dataset 104, learning model 106, and data augmentation module 110 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Dataset 104, learning model 106, and data augmentation module 110 may be downloaded to persistent storage 308 through communications unit 310.

I/O interface(s) 312 allows for input and output of data with other devices that may be connected to computing device 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., dataset 104, learning model 106, and data augmentation module 110 can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:

defining, by one or more processors, a plurality of augmentations for a dataset for training a learning model, wherein the plurality of augmentations comprise a set of parameterized transformations, wherein the set of parameterized transformations are sampled randomly from ranges of possible values to ensure that an augmented data sample is novel and satisfies a natural data distribution associated with the dataset, wherein the plurality of augmentations include applying image rotation, applying image contrast, and adding random noise;

tuning, by the one or more processors, the ranges as a regular hyperparameter;

applying, by one or more processors, the plurality of augmentations to the dataset to generate an augmented dataset;

training, by the one or more processors, the learning model with the augmented dataset;

measuring, by the one or more processors, a respective hardness of one or more data samples in the dataset by running inference on the dataset at an end of each epoch while training the learning model, wherein hardness of a data sample is a risk of losing a learnable signal responsive to an augmentation strength, wherein the augmentation strength is a single scalar parameter that defines an amount of deviation of an augmented data sample from a source of the augmented data sample;

adjusting, by the one or more processors, the plurality of augmentations for the one or more data samples based on a respective measured hardness of the one or more data samples to generate a plurality of adjusted augmentations, wherein adjusting the plurality of augmentations includes adjusting the ranges of one or more augmentations, based on the augmentation strength, by scaling upper and lower random sampling bounds of the ranges, and wherein, for the ranges centered around zero, the upper and lower random sampling bounds are multiplied by the augmentation strength;

applying, by the one or more processors, the plurality of adjusted augmentations to the dataset; and training, by the one or more processors, the learning model with the plurality of adjusted augmentations applied to the dataset, comprising:

gradually increasing, by the one or more processors, the augmentation strength on top of the ranges of the one or more augmentations, as adjusted per data sample, to increase an overall data hardness as a form of curriculum learning.

2. The computer-implemented method of claim 1, wherein the respective measured hardness is based on how far a respective prediction from the learning model is from a respective ground truth label.

3. The computer-implemented method of claim 1, wherein measuring the respective hardness includes measuring a respective hardness of each data sample in the dataset.

4. The computer-implemented method of claim 3, wherein adjusting the plurality of augmentations includes adjusting the ranges of the one or more augmentations for each data sample based on the respective measured hardness of each data sample in the dataset.

5. The computer-implemented method of claim 1, wherein applying the plurality of augmentations to the dataset to generate the augmented dataset comprises applying the plurality of augmentations without modification of the ranges and with the augmentation strength initially set to one.

6. The computer-implemented method of claim 1, wherein adjusting the plurality of augmentations comprises increasing the augmentation strength for an easy sample, wherein the sampling ranges are increased by moving a lower bound of the sampling ranges down and an upper bound of the sampling ranges up.

7. The computer-implemented method of claim 1, wherein adjusting the plurality of augmentations comprises decreasing the augmentation strength for a hard sample, wherein the sampling ranges are decreased by moving a lower bound of the sampling ranges up and an upper bound of the sampling ranges down.

8. A computer program product comprising:

one or more computer readable storage media, and program instructions collectively stored on the one or more computer readable storage media, the program instructions executable by one or more processors to cause the one or more processors to perform operations comprising:

defining a plurality of augmentations for a dataset for training a learning model, wherein the plurality of augmentations comprise a set of parameterized transformations, wherein the set of parameterized transformations are sampled randomly from ranges of possible values to ensure that an augmented data sample is novel and satisfies a natural data distribution associated with the dataset, wherein the plurality of augmentations include applying image rotation, applying image contrast, and adding random noise;

tuning the ranges as a regular hyperparameter;

applying the plurality of augmentations to the dataset to generate an augmented dataset;

training the learning model with the augmented dataset;

measuring a respective hardness of one or more data samples in the dataset by running inference on the dataset at an end of each epoch while training the learning model, wherein hardness of a data sample is a risk of losing a learnable signal responsive to an augmentation strength, wherein the augmentation strength is a single scalar parameter that defines an amount of deviation of an augmented data sample from a source of the augmented data sample;

adjusting the plurality of augmentations for the one or more data samples based on a respective measured hardness of the one or more data samples to generate a plurality of adjusted augmentations, wherein adjusting the plurality of augmentations includes adjusting the ranges of one or more augmentations, based on the augmentation strength, by scaling upper and lower random sampling bounds of the ranges, and wherein, for the ranges centered around zero, the upper and lower random sampling bounds are multiplied by the augmentation strength;

applying the plurality of adjusted augmentations to the dataset; and training the learning model with the plurality of adjusted augmentations applied to the dataset, wherein training the learning model with the plurality of adjusted augmentations applied to the dataset comprises:

gradually increasing the augmentation strength on top of the ranges of the one or more augmentations, as adjusted per data sample, to increase an overall data hardness as a form of curriculum learning.

9. The computer program product of claim 8, wherein the respective measured hardness is based on how far a respective prediction from the learning model is from a respective ground truth label.

10. The computer program product of claim 8, wherein measuring the respective hardness includes measuring a respective hardness of each data sample in the dataset.

11. The computer program product of claim 10, wherein adjusting the plurality of augmentations includes adjusting the ranges of the one or more augmentations for each data sample based on the respective measured hardness of each data sample in the dataset.

12. The computer program product of claim 8, wherein applying the plurality of augmentations to the dataset to generate the augmented dataset comprises applying the plurality of augmentations without modification of the ranges and with the augmentation strength initially set to one.

13. The computer program product of claim 8, wherein adjusting the plurality of augmentations comprises increasing the augmentation strength for an easy sample, wherein the sampling ranges are increased by moving a lower bound of the sampling ranges down and an upper bound of the sampling ranges up.

14. The computer program product of claim 8, wherein adjusting the plurality of augmentations comprises decreasing the augmentation strength for a hard sample, wherein the sampling ranges are decreased by moving a lower bound of the sampling ranges up and an upper bound of the sampling ranges down.

15. A computer system comprising:
- one or more computer processors, one or more computer readable storage media, and program instructions stored on the one or more computer readable storage media executable by at least one of the one or more computer processors to cause the computer system to perform operations comprising:
- defining a plurality of augmentations for a dataset for training a learning model, wherein the plurality of augmentations comprise a set of parameterized transformations, wherein the set of parameterized transformations are sampled randomly from ranges of possible values to ensure that an augmented data sample is novel and satisfies a natural data distribution associated with the dataset, wherein the plurality of augmentations include applying image rotation, applying image contrast, and adding random noise;
- tuning the ranges as a regular hyperparameter;
- applying the plurality of augmentations to the dataset to generate an augmented dataset;
- training the learning model with the augmented dataset;
- measuring a respective hardness of one or more data samples in the dataset by running inference on the dataset at an end of each epoch while training the learning model, wherein hardness of a data sample is a risk of losing a learnable signal responsive to an augmentation strength, wherein the augmentation strength is a single scalar parameter that defines an amount of deviation of an augmented data sample from a source of the augmented data sample;
- adjusting the plurality of augmentations for the one or more data samples based on a respective measured hardness of the one or more data samples to generate a plurality of adjusted augmentations, wherein adjusting the plurality of augmentations includes adjusting the ranges of one or more augmentations, based on the augmentation strength, by scaling upper and lower random sampling bounds of the ranges, and wherein, for the ranges centered around zero, the upper and lower random sampling bounds are multiplied by the augmentation strength;
- applying the plurality of adjusted augmentations to the dataset; and
- training the learning model with the plurality of adjusted augmentations applied to the dataset, wherein training the learning model with the plurality of adjusted augmentations applied to the dataset comprises:
  - gradually increasing the augmentation strength on top of the ranges of the one or more augmentations, as adjusted per data sample, to increase an overall data hardness as a form of curriculum learning.

16. The computer system of claim 15, wherein the respective measured hardness is based on how far a respective prediction from the learning model is from a respective ground truth label.

17. The computer system of claim 15, wherein measuring the respective hardness includes measuring a respective hardness of each data sample in the dataset.

18. The computer system of claim 17, wherein adjusting the plurality of augmentations includes adjusting the ranges of the one or more augmentations for each data sample based on the respective measured hardness of each data sample in the dataset.

19. The computer system of claim 15, wherein applying the plurality of augmentations to the dataset to generate the augmented dataset comprises applying the plurality of augmentations without modification of the ranges and with the augmentation strength initially set to one.

20. The computer system of claim 15, wherein adjusting the plurality of augmentations comprises: increasing the augmentation strength for an easy sample, wherein the sampling ranges are increased by moving a lower bound of the sampling ranges down and an upper bound of the sampling ranges up; and
- decreasing the augmentation strength for a hard data sample, wherein the ranges are decreased by moving a lower bound of the ranges up and an upper bound of the ranges down.

* * * * *